(No Model.)

R. HEMINGRAY.
FASTENER FOR JAR TOPS.

No. 342,602. Patented May 25, 1886.

ATTEST
O. M. Hill
M. M. Smith

INVENTOR
Robert Hemingray
by Wm. Hubbell Fisher,
Att'y.

N. PETERS, Photo-Lithographer, Washington, D. C.

UNITED STATES PATENT OFFICE.

ROBERT HEMINGRAY, OF COVINGTON, KENTUCKY.

FASTENER FOR JAR-TOPS.

SPECIFICATION forming part of Letters Patent No. 342,602, dated May 25, 1886.

Application filed February 23, 1886. Serial No. 192,766. (No model.)

*To all whom it may concern:*

Be it known that I, ROBERT HEMINGRAY, a citizen of the United States, and a resident of the city of Covington, in the county of Kenton and State of Kentucky, have invented new and useful Improvements in Fasteners for Glass-Jar Tops, of which the following is a specification.

Figure 1:
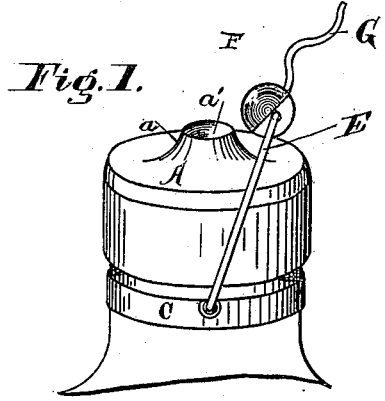
Figure 2:
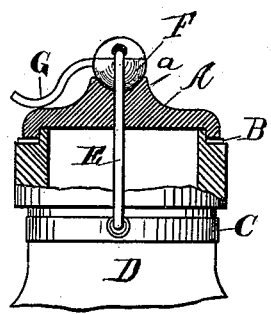
Figure 3:
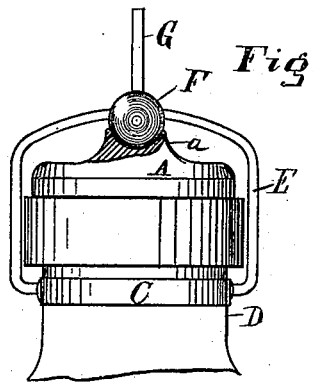
Figure 4:
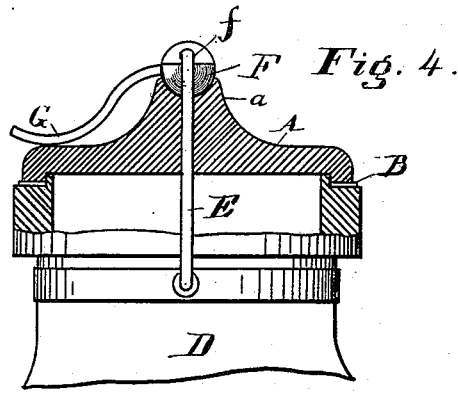
Figure 5:
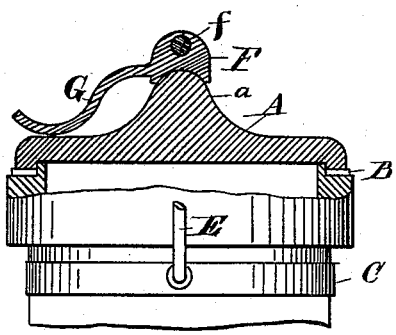
Figure 6:

In the accompanying drawings, forming part of this specification, Figure 1 is a perspective view of a jar provided with my device. Fig. 2 is a side elevation of the same, the cover being shown in section and clamped down. Fig. 3 is an elevation taken at right angles to the view shown in Fig. 1, the cover being partly shown in section. Fig. 4 is a sectional view of a jar-top provided with my device, the figure being drawn upon a somewhat larger scale in order to more clearly show the details. Fig. 5 is a sectional view of a jar-top, showing a modification of my device. Fig. 6 is an end view of the ball, showing the shoulders cut away to facilitate the passing of the yoke through it.

The cover A fits on the elastic gasket B in the usual manner. From the center of the cover A an elevation, *a*, projects upwardly, and at its summit is provided with a spheroidal depression, *a'*. Around the neck D of the jar a collar, C, is secured. This collar is preferably of thin sheet metal, and has pivoted in it the yoke or bail E. A ball, F, preferably with shoulders cut out, as shown in Fig. 6, is strung on the yoke E, the yoke passing through a hole, *f*, in the ball. This ball slides easily on the yoke E. A handle, G, rigidly secured to the ball F, projects from it. This handle G is preferably double-curved, for a reason that will presently be set forth. The lid or cover A being first adjusted in position on the jar, the yoke is brought up, as shown in Fig. 1, the ball 3 adjusted to the depression *a'*, and the handle G brought down until it rests on the lid A. The handle G must be so shaped that when it rests on the lid A the yoke E shall be immediately above the center of the lid, and hold the lid down with the greatest possible force.

In the modification shown in Fig. 5 the elevation *a* is provided with a spheroidal top, and the depression is put in the ball F. Otherwise the device is the same. By means of my device the top or lid is readily secured in place, and as readily unlocked, but no force from within the jar can displace the top.

Another advantage of my invention is, that no matter in which direction the lid is placed on the jar the ball will fit into the depression *a'*, and can be immediately locked in place. The lid does not have to be turned around at all in order to enable the locking device to engage it.

Another advantage is, that the ball bears equally in every lateral direction, and thus the likelihood of breaking the lid consequent upon an uneven pressure is obviated. The conical shape of the upper portion of the lid also strengthens the latter. When the lid is locked in position on the jar, the yoke E is vertical, and the full pressure of the ball is exerted to hold down the lid, whereas in some of the locking devices now in use (when the lid is locked to the jar) the yoke has moved beyond and out of a vertical line, and the lid is left somewhat loose, having been relieved of some of the locking-pressure it should receive.

Another advantage which follows from the spherical shape of the ball and depression is, that the ball will fit in place, even if it is not immediately over the center of the jar, and its sliding on the yoke E enables it to adjust itself to any irregularities in the adaptation of the cover to the jar.

What I claim as new and of my invention, and desire to secure by Letters Patent, is—

1. The combination, with a jar and an elastic gasket surmounting the same, of a cover resting on said gasket, said cover having a conical central portion and a spherical socket-bearing at its apex, a collar on the jar having a pivoted yoke, which, when elevated, passes over the cover, and a ball eccentrically pivoted on the yoke and adapted to seat in the bearing at the apex of the cover, said ball having a fixed handle projecting at about a right angle to the central part of the yoke, as set forth.

2. The combination, with the jar, its gasket, and cover having a central cone with a concave depression, of the yoke pivoted to a collar on the jar, a ball eccentrically mounted on the center of the yoke, and a handle secured to the ball, projecting at about a right angle to the pivotal part of the yoke, and having a double curve conforming generally to the cover, as set forth.

ROBERT HEMINGRAY.

Attest:
JNO. W. STREHLI,
MARION M. SMITH.